Nov. 7, 1950  J. F. ROBB  2,528,550
SELF-CONTAINED POWER SCRAPER
Filed March 21, 1947  5 Sheets-Sheet 1
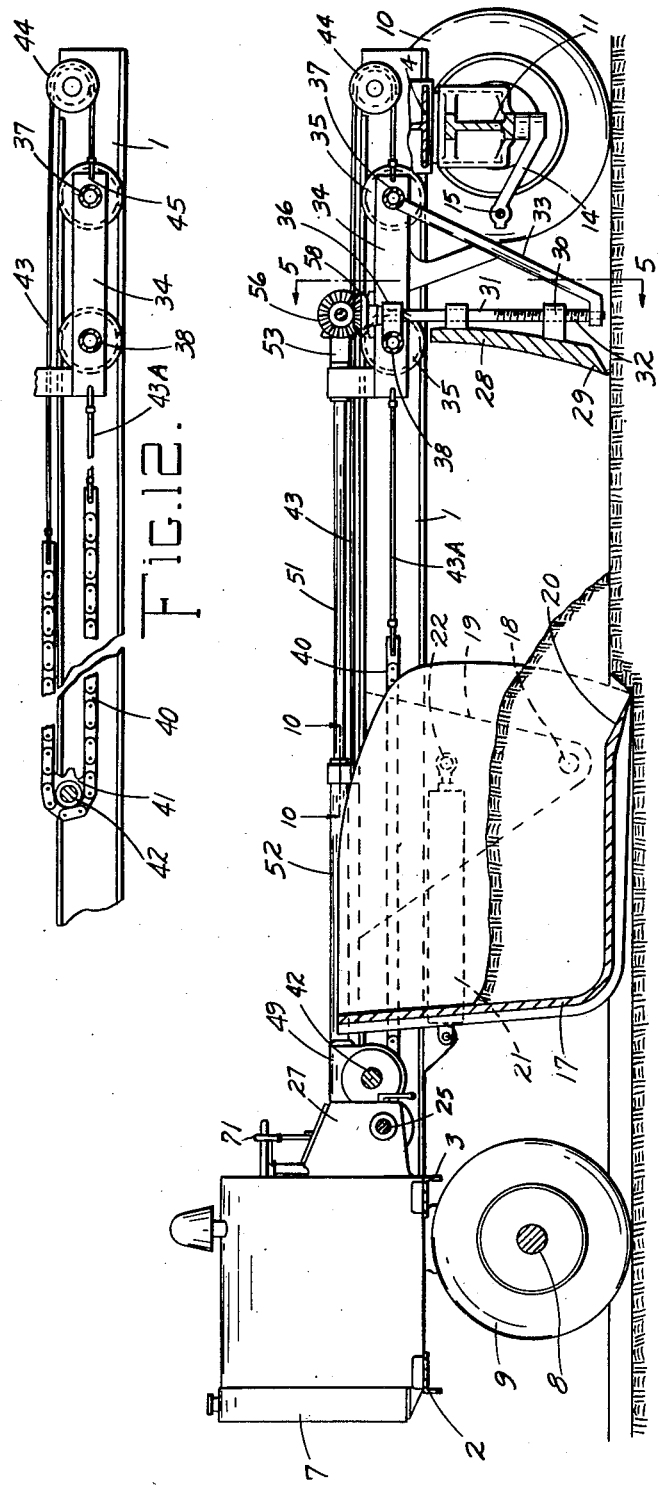
INVENTOR
J. F. Robb
BY Robert Robb
ATTORNEYS

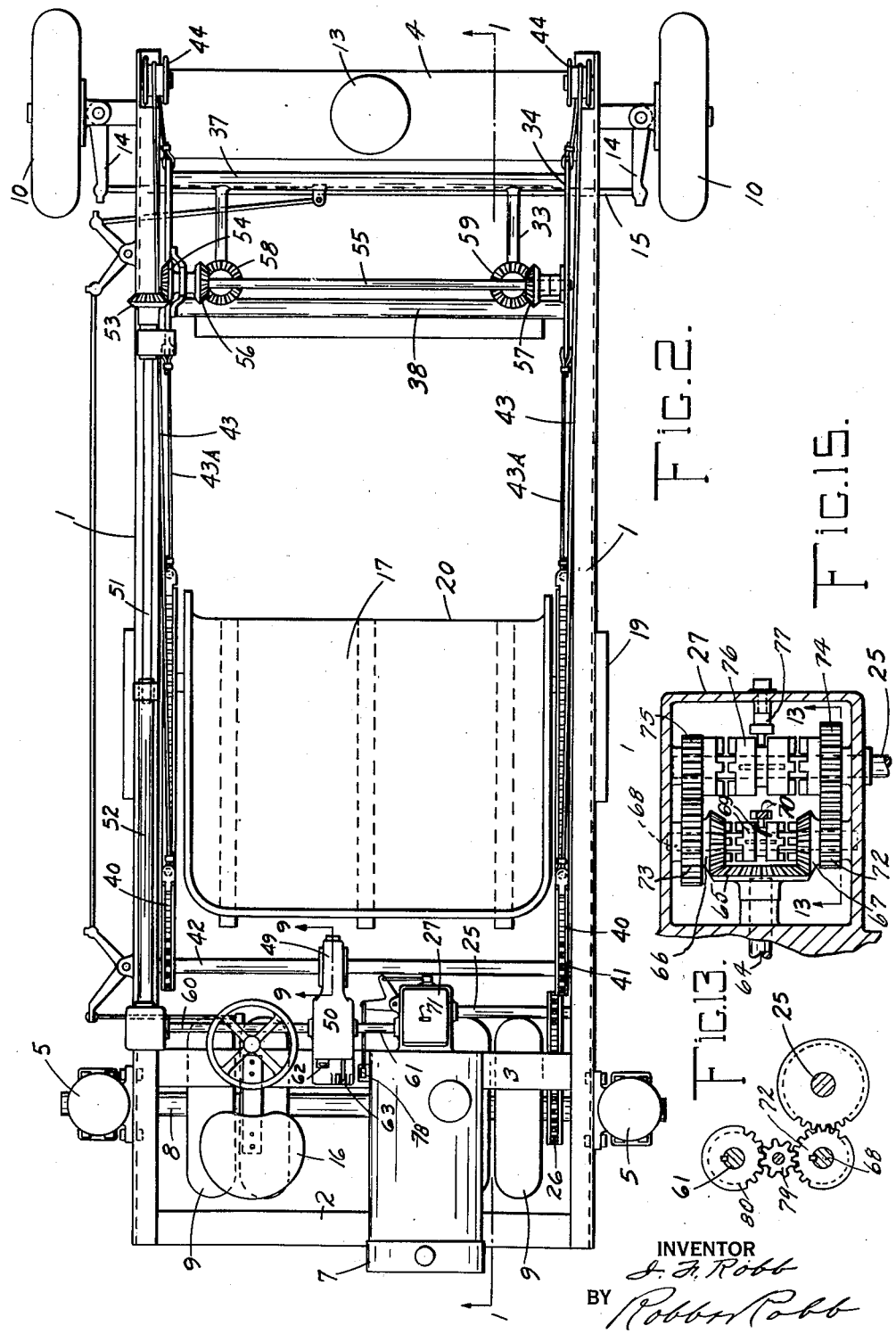

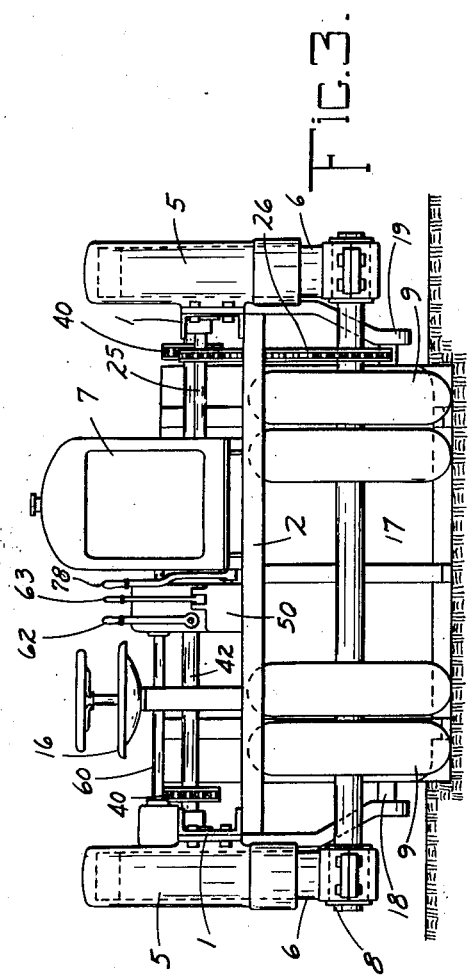

Nov. 7, 1950 J. F. ROBB 2,528,550
SELF-CONTAINED POWER SCRAPER
Filed March 21, 1947 5 Sheets-Sheet 4
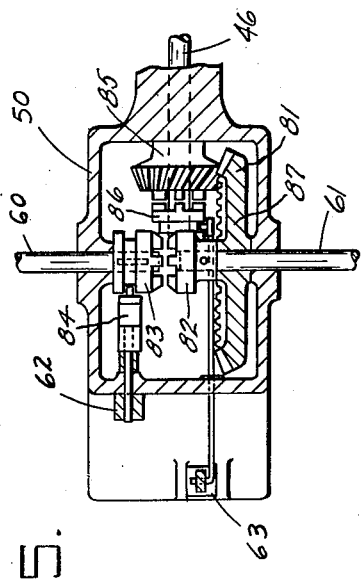
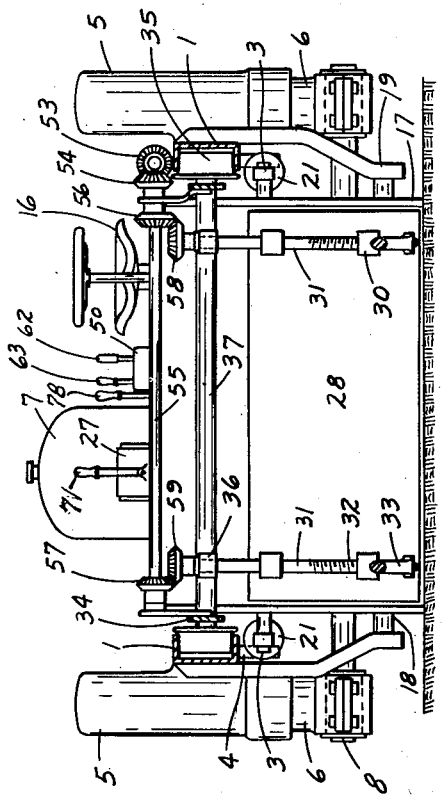
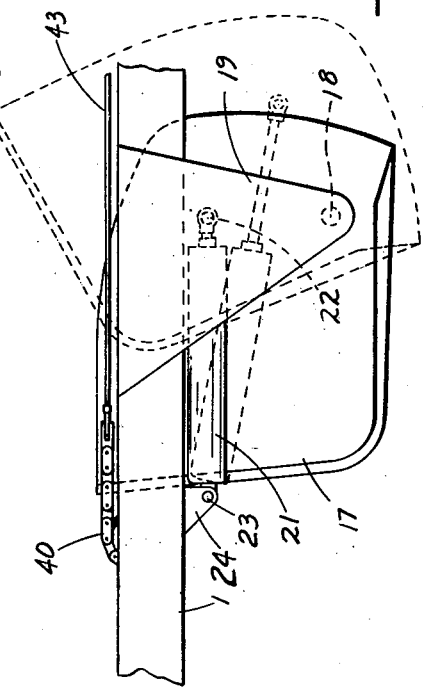
INVENTOR
J. F. Robb
BY
Robb & Robb
ATTORNEYS

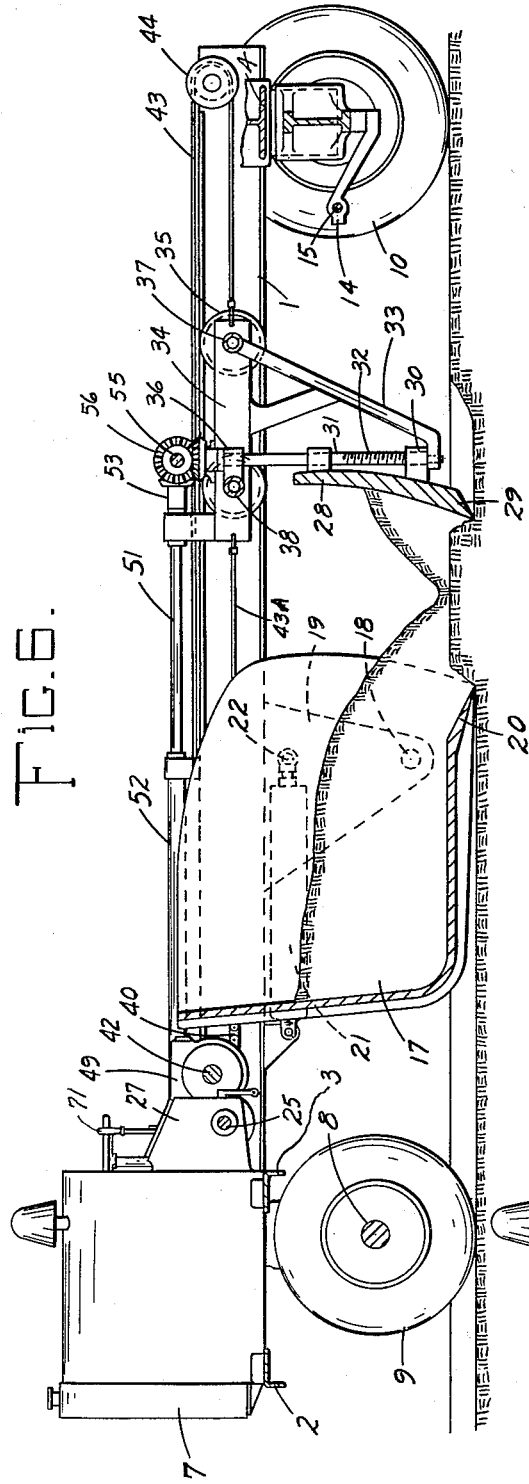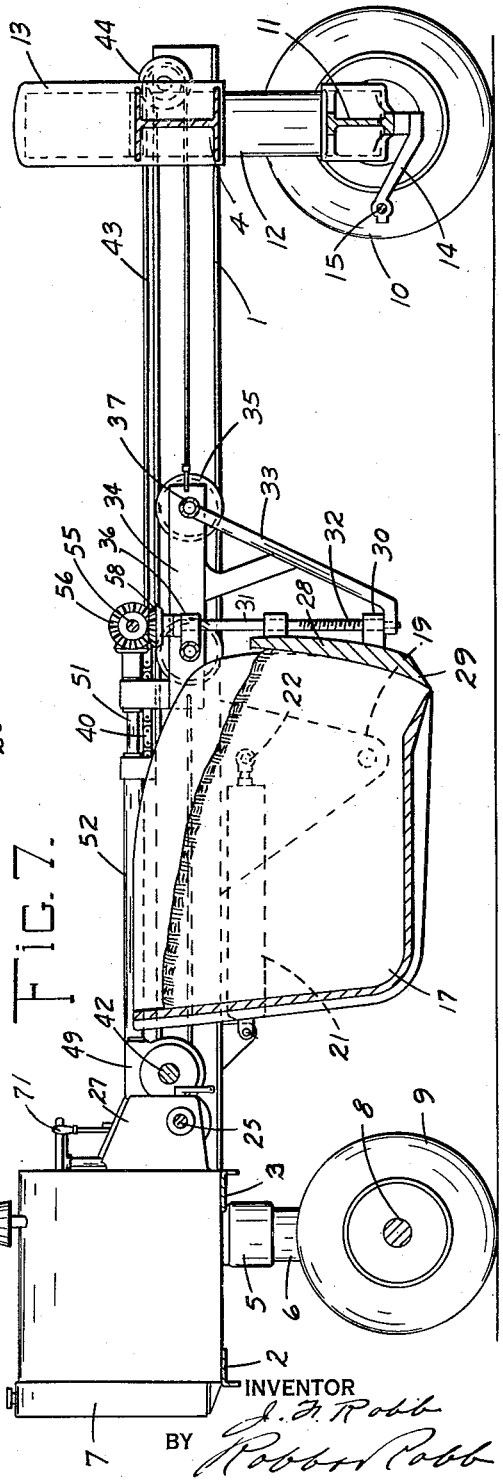

Patented Nov. 7, 1950

2,528,550

UNITED STATES PATENT OFFICE 2,528,550

SELF-CONTAINED POWER SCRAPER

John F. Robb, Cleveland Heights, Ohio, assignor to Koehring Company, Milwaukee, Wis., a corporation Application March 21, 1947, Serial No. 736,138

6 Claims. (Cl. 37—126)

This invention relates to the art of heavy duty scraper and loading vehicles.

In certain of these machines a scraper equipped body or bowl is carried by a vehicle frame and usually propelled by a pulling tractor truck or vehicle or by an engine on the scraper vehicle to cause the scraper of the bowl to cut or dig undug earth and load it into the bowl for carrying away. When a powerful slow moving tractor is used the scraper bowl or body may be fully loaded by the power of the tractor applied to traction means but the travel speed from the digging site is then also slow, as well as the speed of return to such site, necessitating costly time losses. When the scraper bowl vehicle is mounted on wheels for relatively high travel speed, there is not ordinarily enough traction effort obtainable at the wheels to propel the bowl digging and scraping element far enough to cause the bowl to receive a full pay-load. Therefore, an additional traction vehicle is used to afford the necessary supplemental power to push the high speed scraper until it is full of dirt ready to carry off. Such additional power means involves use of a costly separate machine, obviously, rendering the cubic yard cost of dirt digging and removal correspondingly expensive.

It has been proposed heretofore to eliminate the use of the extra pushing machine, in the above use of the heavy duty scraper, by providing a fast moving scraper vehicle having self contained power sufficient to scrape undug earth during forward movement and thus load into the bowl or body a large portion of the pay-load, by applying the power to traction wheels. When the wheels begin to spin and lose traction for further loading, provisions are had whereby a secondary scraper is brought into action and operated by the contained power of the vehicle, independently of traction effort, to also dig and scrape undug earth and carry same into the bowl of the vehicle. Thus will be obtained a complete filling of the bowl with a full pay-load.

My invention involves improvements in the last described type of double action scraping, digging and loading machine, one capable of excavating and loading the carry-off body or bowl with a full pay-load by its self-contained power and also capable of using such self-contained power for high speed travel of the vehicle to and from the site of use, where the digging or scraping travel must usually be at low speed with great digging power.

The details of construction of my improved machine will be evident on reference to the following description and the accompanying drawings, in which:

Figure 1 is a vertical longitudinal sectional view of a scraping vehicle or machine embodying my invention, the section taken on the line 1—1 of Figure 2.

Figure 2 is a top plan view of the same.

Figure 3 is a rear elevation of same.

Figure 4 is a view and front elevation of the same.

Figure 5 is a vertical sectional view taken about on the line 5—5 of Figure 1.

Figure 6 is a view similar to Figure 1, but showing the secondary or auxiliary scraping member in a manner depicting its active working operation after same is caused to penetrate a digging depth into the earth, this view being distinguished from Figure 1 in that in the latter view the auxiliary scraping member is out of operation.

Figure 7 is a view similar to Figure 1, but illustrating the secondary scraping member in its closed position in relation to the open end of the body or bowl, with the frame of the machine elevated ready for high speed travel off to the place where the load in the bowl is to be deposited.

Figure 8 is fragmentary side view showing the main bowl scraper unit in full lines in its digging position, and in dotted lines in its tilted or dumping position.

Figure 9 is a detailed fragmentary sectional view taken about on the line 9—9 of Figure 2.

Figure 10 is a detailed sectional view taken on the line 10—10 of Figure 1.

Figure 11 is a fragmentary sectional view bringing out more clearly the connection of the piston raising members with the rear axle.

Figure 12 is a fragmentary view in elevation of one of the side channels of the machine bringing out more clearly the mounting means of the trolley or carriage carrying the secondary scraper, and the actuating means for this carriage. Figures 13, 14, and 15 are detail views of the transmission and clutch features.

Referring to the drawings, the frame of my loading or scraping vehicle or machine is comprised of the spaced longitudinal side channels 1, the latter being connected by a series of cross members generally designated at 2, 3 and 4. At the rear end thereof the frame aforesaid has mounted at the outer sides of the channel members 1 the cylinders 5 of fluid pressure units which include piston members 6 that operate in cylinders 5 and by pressurizing these units from any suitable source of pressure supplied from a storage tank on the frame, cylinders 5 may be raised from the position shown in Figure 6 to the position shown in Figure 7, in an obvious manner. The storage means for the pressure fluid referred to may be supplied with its pressure by pump or any other suitable like means driven from the engine 7 mounted on the rear end of the frame.

The piston members 6 are attached directly as seen in Figure 11 and in Figure 3 quite clearly to the rear axle 8 of my machine, said rear axle 8 carrying the rubber mounted wheels 9, affixed thereto and driven thereby to obtain a forward desired traction for the vehicle.

At the front end of the vehicle are provided the front rubber mounted wheels 10 carried by a cross axle 11 at the central portion of which is provided a hydraulic unit comprising a piston member 12, which operates in a cylinder member 13 on the cross member 4 of the frame, the latter located at the front extremity of the channels 1. By admitting pressurized fluid into the cylinder 13 the front end of the frame of my vehicle may be elevated in a manner similar to the elevation of the rear end by the admission of pressurized fluid into the cylinders 5. The pressurized fluid may be supplied from the same storage tank, not shown, by suitable controls, also not necessary to be shown because conventional in the art. The front end of the frame of the vehicle may thus be elevated in the same general manner as the rear end of the vehicle, as quite clearly shown by Figure 7 of the drawings, in which pressurized fluid has been admitted to the cylinders 5 and 13, so as to raise the frame of the vehicle in relation to the front and rear wheels 9 and 10 respectively.

The front wheels 10 are carried on suitable stub axles pivotally connected at 13 to the front axle 11 of my machine and said stub axles are equipped with steering arms 14 connected by a drag link 15 and adapted to be operated by steering wheel located adjacent to the seat 16 at the rear end of the vehicle where the operator is stationed. As seen best in Figures 1, 6 and 7 the main body or bowl for receiving the load of dirt or material, designated 17, is pivoted at the side points 18 to the lower ends of depending brackets 19, one of which projects downwardly from each of the channels 1. The said bowl or body is comprised of a bottom, a back and suitable sides and is open at its front end. The bottom portion is equipped at the front edge thereof with a digging scraper 20 of the usual type and the said bowl unit is of a conventional form known to the art being adapted to be tilted about the pivot points 18 by means of suitable hydraulic units 21, the piston elements of which are attached to the sides of the bowl at 22, and the cylinder elements of which are pivoted at 23 to brackets 24 on the undersides of the channels 1.

Pressurized fluid may be admitted to the cylinders 21 of the said hydraulic units to thereby force the piston elements in a rightward direction as seen in Figure 6 of the drawings, thereby rocking the bowl or body 17 for a tilting discharge action, after the load in the bowl 17 has been elevated by raising the frame structure as a unit. The tilting discharge action will of course be performed after the load has been carried away from the site where it is dug and scraped into the body, to the point where the load is to be deposited or spread upon a new site or location.

It is contemplated to drive the rear axle or wheel shaft 8 for the traction wheels 9 by utilizing a chain drive connection involving sprockets upon an upper engine-driven shaft 25, operated from the engine 7, and on the axle shaft 8, which sprockets are connected by the chain 26—see Figure 3. The chain drive between the shaft 25 and the axle 8 is provided with a suitable slack take-up for its adjustment when the frame is raised or lowered with respect to the wheels. The drive to the axle is taken off from the engine shaft 64 through change speed gearing in a housing 27—see Figure 2—to the shaft 25.

The usual control lever for the change speed gearing may be employed so that the shaft 8 may be driven at slow speed with great power in moving the scraper vehicle forwardly while the scraper 20 of the bowl 17 is in action as seen in Figure 1: also the same speed gearing may then be thrown into higher ratio of speed when such digging action is discontinued, when the frame and its supported parts are elevated relatively to the wheels and the load in the bowl 17 is to be carried off at high speed to the place of deposit or spreading thereof.

I will now proceed to describe the secondary scraper unit which is provided on my machine in advance of the scraper 20 of the bowl 17, and which is to be lowered to penetrate the undug earth in advance of said bowl 17, thereafter to be caused to move in a direction toward the bowl relatively whereby to dig and scrape a tangible portion of the pay load by which the bowl is to be finally filled.

As seen best in Figures 1, 5, 6 and 7, the secondary or auxiliary scraper is designated 28. It comprises a relatively vertical blade, properly equipped at its lower end with a hardened earth penetrating and digging member 29, adapted to enter the earth almost vertically but having a slight forward inclination. The secondary scraping and digging member 28 is supported at its opposite ends by pairs of loop extensions 30 integral with the member 28 and projecting from its front side. The lower ones of the pairs of loop members 30 have openings therein which are internally threaded whereas the upper ones of these pairs are not internally threaded.

A raising and lowering shaft 31 is disposed at each side of the machine and is located a short distance from the inner sides of the frame channels 1. The two vertical shafts 31 are threaded at their lower ends as shown in 32 and they are provided with bearings at the lower extremities in the lower ends of inclined brackets 33, which depend from the front end portion of carriage 34 that is mounted to ride on trolley wheels 35, that travel in the channels of the two channel members 1 that comprise the sides of the frame of the machine. The upper ends of the shafts 31 pass through bearing members 36 attached to the frame of the carriage 34. The carriage 34 is really made up of side frame members connected by a front cross shaft 37 and a rear cross shaft 38, and the whole carriage with the supported secondary scraping and digging member 28, bracing brackets 33 of the supporting trolley wheels 35, travels back and forth longitudinally of the frame members 1, or remains stationary at a predetermined adjustment as will be more fully set forth.

For the moving of the carriage 34 longitudinally of the frame channels 1, I provide a chain and cable unit at each side of the machine on the inner side of the channel member 1 adjacent thereto. The chain and cable unit is seen best in Figure 12 alone as comprising a sprocket chain element or member 40, trained around a sprocket 41, on adjacent end of an engine driven shaft 42, the ends of the chain element 40 being attached to the end of the cable element 43 which is trained around a suitable guide pulley 44 on the inner side of the adjacent channel 1 of the frame. The cable element really comprises two sections, an upper section attached to the upper lap of the chain element 40, passing around the pulley 44 and attached at 45 to the front end of the adjacent side of the carriage 34. The other portion of the cable element is designated 43—A and is secured to the other end of the carriage 34, the rear end, and to the front extremity of the lower lap of the chain element 40.

There will be understood to be used two of the chain and cable units 40—43—43—A, one on each side at the inner side of the channels 1.

These chain and cable units being attached drivingly by the sprockets 41 to the driven shaft 42, will be operated simultaneously to apply power to the carriage 34 either to move the carriage forwardly on the frame channels 1 or to move the carriage rearwardly on said channels 1, or the chain cable units may remain stationary so as to hold the carriage 34 and its supported secondary scraper and digging member 28 stationary as when it is in the position of Figure 1 or in the position of Figure 7.

The shaft 42 is a shaft extending transversely of the frame of the machine near the rear end and in advance of the engine 7. Power is transmitted to the shaft 42 through the transmission change speed gear unit 27 gears to a power takeoff including a longitudinal shaft 46, see Figure 9, which shaft carries a worm 47 engaging a worm gear 48 in the housing 49.

Suitable clutch means for driving the shaft 46 is provided in a clutch casing or housing 50, adjacent to the chain speed gear housing 27 and is designed to reversibly drive the shaft 42 for driving the carriage 34 in opposite directions along the frame channels 1.

The clutch unit will be more fully described later in conjunction with the description of other clutch means hereinafter referred to.

Obviously for raising and lowering the secondary scraper and digging blade 28—29, it is necessary to reversibly rotate the vertical screw shafts 31. For this purpose I provide above one of the channels 1, opposite the main body a telescopic driving shaft made up of the inner section 51 and the outer tubular section 52.

The telescopic shaft 51—52 is mounted in suitable bearings on the frame channel 1 adjacent thereto and at the forward end of the section 51 is a beveled gear connection 53 with the adjacent beveled gear 54 on a cross shaft 55. This cross shaft 55 near the front end of the machine carries two beveled gears 56 and 57. These last two beveled gears mesh with horizontal beveled gears 58 and 59 respectively.

The beveled gears 58 and 59 are keyed to the upper ends of the threaded shafts 31 by which the member 28—29 is raised and lowered. The telescopic shaft 51—52 is therefore susceptible of being driven in reversed directions to accomplish the reverse driving of the screw shafts 31 whereby to raise and lower the member 28—29, lower the same to cause it to penetrate the earth, and raise the same to withdraw it to an inoperative position from earth penetration.

For driving the telescopic shaft 51—52, there is provided a power take-off shaft 60 which leads from the clutch housing 50, and suitable clutch means for reverse driving of the shaft 60, are provided, affording clutch driving connections between said shaft 60 and the change speed gearing, the latter having the output shaft 61 that leads to the clutch housing 50. The clutch means for driving the shaft 60 is controlled by a clutch lever 62, and clutch means for controlling the driving reversibly of the shaft 42 is operated by a second clutch lever 63.

Referring to the transmission unit 27 (Figures 12 and 13), the input from the engine 7 is through engine shaft 64 driving bevel gear 65 which engages bevel gears 66 and 67 that freely rotate on jack shaft 68. Gears 66 and 67 have facing clutch members to coact separately with like parts on a middle clutch member 69 splined slidably on the shaft 68, or assume a neutral position, as in Figure 15. Clutch member 69 is controlled by the shifter 70 operated by the lever 71. Keyed to shaft 68 is a small spur gear 72 and a large spur gear 73 meshed with spur gears 74 and 75 respectively on the output shaft 25. Gears 74 and 75 have clutch members on their inner faces and rotate freely on the shaft 25. A clutch member 76 between the gears 74 and 75 is splined on shaft 25 and will drive at high or low speed by engaging either gear 74 or gear 75, respectively. The clutch 76 is controlled by the shifter 77 operated by lever 78.

An idler pinion 79 is meshed with gear 72 on shaft 68 and gear 80 on shaft 61.

The shaft 61 will be rotated at one gear ratio in either direction depending on which bevel pinion 66 or 67 is engaged by the clutch member 69.

The input shaft 61 has bevel hypoid gear 81 keyed thereto (see Figure 14), said gear having clutch member 82 fixed thereto. The shaft 60 has a sliding clutch member 83 to engage member 82. The lever 62 by the shifter 84 can move the member 83. Shaft 46 is mounted at a level lower than shaft 61, is keyed to bevel pinion 85 and clutch 86 on shaft 46 can engage clutch teeth of pinion 85 and is controlled by lever 63 actuating the shifter 87.

The general construction of my machine having been described in detail above, I will now proceed to describe the operation thereof.

It will be assumed that the machine has been driven to the place of scraping, digging and loading and that the operator has released the pressure fluid in the cylinders 5 and 13 so as to permit the frame of the machine and its supported parts to be lowered to bring the scraping and digging blade 20 of the body or bowl 17 into digging engagement with the earth. The arrangements of the parts of the machine under the above condition is as shown in Figure 1, the machine having been driven forward by traction at the rear driving wheels 9 so that the bowl 17 is partially filled as somewhat diagrammatically illustrated in Figure 1. Now if the loading of the machine bowl 17 has been partly completed and it is found that the traction effort at the rear wheels 9 is insufficient to propel the machine any further distance forwardly, something the operator will sense by reason of the spinning of the wheels 9, the next thing in order to do is to bring the secondary scraper and digging member 28—29, into action. To do this, the operator will actuate the lever 62 for driving the telescopic shafts 51—52 in one direction, the proper direction to rotate the vertical screw shafts 31 for causing downward movement of the secondary scraper 28—29. This will effect the penetrating movement of the scraper 28—29 in the earth and in the manner that is illustrated in Figure 6, in respect to the digging depth of same, and thereupon the operator will operate the clutch lever 63 so the power take-off gearing in the housing 49 will be put into operation to turn the shaft 42 in one direction, after stopping shaft 51—52.

This selected direction of movement of the shaft 42 will be clockwise as seen in Figure 12, from gearing 27 thereby causing the chain and cable units 40, 43 and 43—A to move the carriage 34 on which the scraper member 28 is mounted, in a rearward direction or toward the bowl 17. Figure 6 depicts this operation showing the scraper 28 proceeding in the direction of the bowl and performing its digging and scraping operation at a predetermined digging depth in the undug earth.

In due course the scraper 28 will reach a position in which its member 29 is juxtaposed to the scraping member 20 of the bowl 17 at which time the operator will throw the clutch lever 63 into neutral position, and at this time the secondary scraping member 28 will have dug up and scraped into the bowl 17 a tangible amount of newly dug material which will complete the filling of the bowl 17 with a full pay load.

The control means, not shown, for the pressurizing of the cylinders 5 and 13 will now be actuated so as to put the piston members 6 and 12 under pressure thereby raising the cylinders 5 and 13, and the entire frame and supported parts of the machine to a position such as shown in Figure 7 wherein the fully loaded bowl has been elevated in the manner above described. My scraping machine is now ready to be driven off to the place of depositing or spreading of the material in the bowl 17 for which purpose the levers of the transmission gear unit 27 will be operated 1st—to go into low speed and then to increase the speed of the machine to high speed so that it may travel at the latter speed to the place of depositing the material. When reaching such place the operator will actuate the clutch lever 63 to operate the shaft 42 in a contra-clockwise direction, thereby to move the secondary scraper member 28 forwardly on the frame to a position about as illustrated in Figure 1. The bowl 17 may be then tilted by the hydraulic units 21 and the load deposited in one place if the machine is stopped, or spread over a considerable area if the machine is driven slowly forward.

The machine is now driven back to the place where the digging and scraping is to be continued for the loading of the bowl 17 with the parts substantially in the condition in which they are left after dumping the bowl 17, the bowl 17 being returned to its lowered position by the units 21. When the machine has reached the place for its scraping, digging and loading operations the frame of the machine and the supported parts will be lowered so as to bring the scraper blade 20 of the bowl 17 into an operative position like shown in Figure 1, the machine will be propelled forwardly as illustrated in this figure, and the operation of the machine continued in the manner as previously pointed out in the complete cycle of operation just recited. The front scraper 28—29 will previously be raised on 34.

It will be understood that the sections 51 and 52 of the telescopic shaft drive for the screw shafts 31 are connected by any suitable spline connection so that these sections cannot rotate relatively to each other but will revolve together.

The operation of my machine as above generally set forth may be modified by combination actions of the control mechanisms, particularly the clutch controls. Thus as the lever 62 is thrown to cause a drive to the telescopic shaft for lowering the secondary scraper 28 by the screw shafts 31, the lever 63 may be simultaneously operated to cause clockwise rotation of the shaft 42 and thereby as the scraper member 28 is lowered it will be simultaneously caused to move rearwardly towards the bowl 17 and its digging and scraping action will be facilitated in an obvious manner. Thus it will be understood that the secondary scraping member 28 may be brought to its lowered position of digging depth, independently of the longitudinal or rearward movement of the said scraper member toward the bowl 17 or simultaneously with such movement. Moreover it will be apparent that the member 28 is lowered and raised independently of the frame of the machine, as well as adapted to move upwardly and downwardly with such frame when the frame is caused to rise or lower by the pressuring of units 5 and 6 and 12 and 13, or releasing the pressure in these latter units.

It will be understood that many different general types of connections may be employed between the various moving parts of my machine, and those illustrated are primarily designed for effective operation to exemplify the mode of functioning of the various main and essential features of my construction. The action of screw shafts 31 is self-locking in relation to the secondary scraper, in maintaining the latter in its out-of-ground position, or at a position in which it is penetrating the earth at the blade portion 29.

It will be apparent from the foregoing that in the operation of my machine I utilize solely the self-contained power of the engine 7, that at a certain period in the forward propelling movement of the machine said power may of course become ineffective for transmitting traction effort to the driving wheels 9, but the power of the engine is always available to quickly throw into operation the front secondary scraper 28—29 so as to cause a complete loading of a pay load of material into the bowl 17. Of course when the member 28—29 has been moved rearwardly toward the bowl so as to perform its desired function of scraping, digging and loading material into the bowl, said member 28—29 constitutes a closure to retain the loaded materials in the bowl until they are discharged in the manner set forth above.

An especially important feature of my invention resides in the manner in which the variable and reverse speeds controlled by the change speed gearing in the gear housing 27 may be employed in conjunction with the operation of the vehicle itself for variable travel speed, or operating the secondary scraper 28—29 for up and down movements, and for moving the secondary scraper bodily rearward or forward, to effectuate the efficient operation of the said scraper 28—29.

If the scraper 28—29 meets a heavy obstacle reverse travel of the machine may be effected, under traction, along with rearward movement of this scraper on the machine for pushing through or past the obstacle.

Having thus described my invention, what I claim as new and desire to secure by Letters Patent of the United States, is:

1. In a scraper machine, in combination, a supporting frame, wheels on which the frame is vertically adjustably mounted, a load receiving bowl mounted thereon, and open at its front end, a main scraper at the front bottom portion of the bowl, instrumentalities for lowering the bowl to the ground and relatively to the wheels to receive material dug and scraped by the main scraper during forward moving of the bowl and for raising the bowl when the material is to be carried off, a secondary scraper member on the frame in advance of the bowl and movable toward and from the same and movable vertically relative to the frame, drive mechanism to move the secondary scraper vertically relatively to the frame to cause it to penetrate undug earth, an engine on the frame, first driving connections between the engine and wheels of the frame and bowl to move them forwardly and second driving connections between the engine and secondary scraper to move the latter toward the bowl while penetrating the earth, the drive mechanism comprising vertical shafts drivingly connected to the secondary scraper.

2. A machine as claimed in claim 1, combined with a driving shaft connected to the vertical shafts, and means to operate the driving shaft from the engine, including a telescopic shaft unit the sections of which move relatively as the secondary scraper is moved toward and from the bowl.

3. A machine as claimed in claim 1, in which a driving shaft is connected to the vertical shafts, combined with means to operate the driving shafts from the engine.

4. A machine as claimed in claim 1, in which a driving shaft is connected to the vertical shafts, combined with means to operate the driving shaft from the engine in opposite directions.

5. A machine as claimed in claim 1, in which the vertical shafts have screw portions engaging the secondary scraper to cause up and down movement of the latter.

6. A machine as claimed in claim 1, combined with means to drive the second mentioned driving connection to move the scraper in an opposite direction.

JOHN F. ROBB.

REFERENCES CITED

The following references are of record in the file of this patent:

UNITED STATES PATENTS

| Number | Name | Date |
| --- | --- | --- |
| 2,396,287 | Robb | Mar. 12, 1946 |